July 30, 1940.                C. G. HARFORD                2,209,694
                      RECOVERY OF SOLIDS FROM BUTTERMILK
                            Filed Aug. 13, 1937

Inventor:
Charles G. Harford,
By Zabel, Carlson, Fitzhugh & Wells
Attorneys.

UNITED STATES PATENT OFFICE 2,209,694

RECOVERY OF SOLIDS FROM BUTTERMILK

Charles G. Harford, Wollaston, Mass., assignor to Arthur D. Little, Inc., Cambridge, Mass., a corporation of Massachusetts Application August 13, 1937, Serial No. 158,921

18 Claims. (Cl. 99—20)

This invention relates to the selective recovery of solids from buttermilk.

It is an object of this invention to provide economic and commercially suitable means of recovering from buttermilk, including in particular pasteurized sour cream buttermilk, casein of suitable quality for coating compositions and for other industrial purposes.

Another object is to provide casein coating compositions, which, when dried, are more resistant to moisture than casein as conventionally prepared and used, and which possess superior flowing and levelling properties.

A further object is to provide from buttermilk an improved emulsifying agent.

Still another object is to recover from buttermilk in edible or potentially edible form the butterfat lost in churning.

A further important object of the invention is to make a commercially practicable division or separation of the buttermilk solids into a plurality of constituents, one of which consists principally of casein and is of such quality that it is capable of commercial use for such purposes as paints, paper coatings and fillings, and glue; another of which contains a relatively high percentage of lipoids, including substantial amounts of lipin present in active form, this second constituent being particularly useful as an emulsifying agent suitable for use in many food products in the place of egg yolk now employed and for other industrial purposes; and a third of which comprises the whey in such form that it may be used for the preparation of stock feed or for the recovery of albumen, lactose, and/or lactates.

Other objects will appear from the following disclosure.

Despite common reference in the patent and technical literature of casein to buttermilk casein, manufacture of casein from pasteurized sour cream buttermilk has not heretofore attained any commercial importance and it appears for some time to have been completely discontinued. Even the slight use which has been made in the past of sweet cream buttermilk in casein manufacture appears at present to have been abandoned or to be insignificant, leaving skim milk as the sole significant source of casein. This situation holds despite increasing demand for casein, the convenient availability of large quantities of pasteurized sour cream buttermilk at central creameries, and the restricted market for sour cream buttermilk, whose only useful present outlet is as a source of feed for stock, and which not infrequently is even discarded as worthless.

In the manufacture of butter, fresh whole milk is first separated into skim milk and cream. This cream is then churned, a portion being converted into butter and a larger portion drained off as the by-product, buttermilk. A few creameries utilize only fresh sweet cream in churning; their product is known as sweet cream butter and their by-product as sweet-cream buttermilk. Frequently these creameries receive fresh whole milk, separating and churning it on their premises, and utilizing the sweet skim milk and sweet cream buttermilk for any of the variety of products for which the first of these, and to a lesser extent the second, are suitable. Most creameries by far, however, churn their butter from sour cream. Ordinarily this has been separated at the farm, allowed to accumulate for a few days for convenience in shipping, and shipped to a central creamery, often hundreds of miles distant. Such cream, by the time of its arrival at the creamery, usually has soured to such an extent that it requires some neutralization. Following neutralization, it is almost invariably pasteurized, usually at 180° F. It is then customarily inoculated with a selected bacterial culture, allowed to resour under controlled conditions, and then churned. As a result of undergoing these processes, the sour cream buttermilk which is discharged from the churn differs appreciably not only from skim milk but from sweet cream buttermilk as well. It is generally considered quite unsuitable for edible purposes and its proteins have usually been affected, a portion thereof usually appearing (in association with other buttermilk constituents) as an extremely soft and fine curd suspended throughout the liquid portion of the buttermilk and tending very slowly to settle therefrom. Buttermilk differs from skim milk likewise in its content of fats and fat-like substances, including lipins such as lecithin. The fats and fat-like substances are of various types, but all come under the general term "lipoids," which will be used hereinafter to designate them. Lipoids are the mixture of fats, substances of a fat-like nature such as lipins, and other substances obtained in the Roese-Gottlieb extraction procedure (see "Official and Tentative Methods of Analysis of the Association of Official Agricultural Chemists," 4th ed.). Lipins are substances of a fat-like nature yielding on hydrolysis fatty acids or derivatives of fatty acids, and containing in their molecule either nitrogen or nitrogen and phosphorus. They include the phospholipins, such as lecithin, cephalin, and sphingomyelin, and the galactolipins or cerebrosides (see "Leicithin and Allied Substances," by Hugh and J. S. Maclean, 2nd ed., p. 3). As used hereinafter the terms "skim milk casein," "buttermilk casein," "casein from buttermilk," etc., refer to the true casein derived from these sources together with such of their associated materials—lipoids, albumen and other non-casein proteins, and ash—as remain with them throughout the manufacturing processes.

Skim milk typically contains some 0.1–0.15% lipoids including about 0.015% lipin, with practically all of the balance butterfat. Buttermilk typically contains some 0.5–0.8% lipoids, including about 0.15% lipin; the great bulk of these lipoids, in conventional methods, tends to go with the casein when this is separated from the whey. As typically used in casein manufacture, skim milk, apart from its reduced lipoid content, is otherwise unaltered from fresh whole milk, and so retains its casein in substantially its original form. Souring of the cream from which sour cream buttermilk is derived, however, of course tends to affect its casein. The casein and other proteins of both sweet and sour cream buttermilks, moreover, are affected by the pasteurization which they customarily receive, sour cream buttermilk tending to be by far the more seriously affected thereby. The casein of sour cream buttermilk customarily is converted at least in part from the minutely and stably suspended form in which it is originally present to very finely dispersed curd floccules of casein in intimate association with the lipoids and other substances present. The cultured lactic fermentation which sour cream receives subsequent to pasteurization, and which sweet cream frequently also receives, though to a lesser degree, and the churning which follows, probably also affect the casein of buttermilk. The churning doubtless tends further to disperse the curd of sour cream buttermilk.

Sweet cream buttermilk, it is seen, occupies a position intermediate between skim milk and sour cream buttermilk. Since it is typically not curdled, its excess lipoid content may be reduced by passing it through a cream separator, though for most uses this is uneconomic. Likewise in casein manufacture the effect of pasteurization upon sweet cream buttermilk may be compensated for to a considerable degree, as by increasing the temperature to which the buttermilk is heated at the time of casein precipitation. Many times as much sour cream buttermilk is available as sweet cream buttermilk, and the latter enjoys markets, e. g., drying for use in food stuffs, from which the former is excluded.

Because of the much greater quantity and more restricted use of sour cream buttermilk, my invention, although equally applicable to all types of buttermilk, has been directed primarily to the utilization of that derived from sour cream and it is this latter type to which hereinafter I especially refer in my examples.

Upon commencing the work which resulted in the present invention, I made diligent inquiry in the literature and among persons familiar with casein manufacture as to why the production of casein from sour cream buttermilk was not commercially practiced. Three chief reasons were evident:

1. Because the casein of all types of pasteurized buttermilk, and in particular of sour cream buttermilk, tends to be dispersed in a very fine, soft and fragile form contrasting strikingly with the tough, granular form in which the casein of unpasteurized skim milk tends to be precipitated, it has been impractical, except possibly by chemical solution and reprecipitation, or for sweet cream buttermilk by other special methods, subsequently referred to, sharply to precipitate the casein, i. e., to make a fairly clean separation between the curd and whey, or to wash it effectively, i. e., to make a fairly clean separation between the curd and its wash water. This condition has been evidenced on the one hand by losses of large quantities of fine casein with the whey and on the other by the dilution of the separated casein by amounts of whey or wash water so large as to interfere with its quality and to hinder its subsequent processing. Even to secure the inadequate separations which have been attained, it has usually been necessary to resort to methods too time consuming or otherwise impractical to become commercial. On page 92 of Edwin Sutermeister's American Chemical Society monograph, "Casein and Its Industrial Application," hereinafter referred to as Sutermeister, A. O. Dahlberg (hereinafter referred to as Dahlberg), states "The curd from pasteurized sour cream is so extremely fine that it is very difficult to handle and recover without resorting to methods which are too expensive, considering the value of the product obtained."

2. Probably due in part to impurities present (see 3 below), but due also to the physical treatment received by cream, and especially pasteurized sour cream, on its way to becoming sour cream buttermilk, buttermilk casein, after drying, may not be completely redissolved by customary methods; hard lumps persist, commonly referred to as albumen and/or denatured casein.

3. Because (a) buttermilk customarily contains much more lipoids than skim milk, these lipoids become associated with the casein as it flocculates, (b) with sour cream buttermilk, typically at least a portion of the casein has flocculated (i. e., the curd has formed) under entirely uncontrolled conditions before casein manufacture commences, and (c) it is difficult to separate the casein from the whey, it has been impractical except possibly by special methods described below to prepare buttermilk casein of adequate purity, large quantities of lipoid in particular being found associated with buttermilk casein to its great detriment in usual industrial application.

The especial importance of its high lipoid content in eliminating buttermilk casein from industrial uses is emphasized by Dahlberg. On page 95 of Sutermeister he states of buttermilk casein: "The fat content is invariably much higher than skim milk casein and may have quite an injurious effect upon the quality of the product, especially in connection with some of the other influencing factors."

On pages 17 and 18 of U. S. D. A. Bulletin 661, Dahlberg writes: "Since all the fat originally in the buttermilk is concentrated in the dried casein, it probably will have a deleterious effect upon the strength and general working properties of the casein. An increased quantity of fat yields not only a casein of poorer solubility and strength, but also a solution of poorer physical qualities.

"The greater strength shown by the low-fat buttermilk casein in practically all instances is more significant when it is considered that the high-fat buttermilk casein showed decreased strength together with poorer handling qualities. The increased quantity of fat has a detrimental effect upon the physical working qualities of the dissolved casein, producing a thin, weak-bodied solution of greatly reduced viscosity which upon cooling has a tendency to become a greasy mixture of poor spreading qualities."

On page 93 of Sutermeister, Browne is quoted as indicating an average fat content of 6.65% for buttermilk casein (made from sweet cream by the ejector method) as against 1.41% for the type of skim casein highest in fat and 0.5% for grain-curd skim casein, now commonly made. In the paper from which this data is taken Browne indicates an even greater discrepancy, citing 9.56% as the average fat content of buttermilk casein tested, with no samples running below 3.79% and one running as high as 31.5% fat.

Moreover as Shaw points out (vol. 12, Journal of Industrial & Engineering Chemistry pp. 1168 ff.) Browne's method of fat analysis (Soxhlet ether extraction) yields results which are lower than the total lipoids present. Shaw employs, with some modification, the Roese-Gottlieb method such as is now generally accepted as the most reliable of methods and which I use for analysis of my casein and buttermilk. Bird points out (Iowa Agricultural Experimental Station, Research Bulletin #175) that the results obtained by ether extraction are, for buttermilk, sometimes sharply below those obtained by the Roese-Gottlieb procedure. It is evident that comparative analyses of buttermilk or buttermilk casein for lipoids are unreliable unless made by the same method, and that some methods previously employed may not be relied upon. Further, buttermilk is a raw material of natural origin, subject to especially wide variation from lot to lot. A fat or lipoid analysis (as fat analyses tend in substance to be) of a single lot of buttermilk casein is therefore meaningless as a subject for generalization, as are also collections of old-fashioned or even accepted analyses of occasional samples of buttermilk casein, which happened to show a low lipoid content. Reliable analytical data treated statistically is needed.

Observing these precautions and using the Roese-Gottlieb method of analysis for lipoids, I have found that ordinary buttermilk casein, as separated from its whey by filtration, carries with it not quite all of its associated lipoid, as indicated by Dahlberg on the basis of earlier analytical procedures, but still carries between 45% and 90% thereof, and commonly runs about or above 20% lipoid (on a bone dry basis). The casein prepared by my method, as described below, is much superior in this respect, generally carrying with it less—and when well operated very considerably less—than 25% of the lipoid present in the buttermilk (as contrasted with 45% to 90% in ordinary buttermilk casein), the lipoid content of the casein prepared by my method usually ranging between 4% and 8%.

The importance of overcoming these disadvantages by means suited to commercial practice is indicated by endeavors to do so marked by references in the patent and technical literature.

Several patents (e. g., U. S. 745,097)—Eberhard; 911,269 and 1,167,434—Reuter; and 1,126,429—Eilersen) are based upon redissolving the already flocculated curd of (sour cream) buttermilk by addition of an alkali to make the buttermilk distinctly alkaline, separating out the lipoids and/or flocculated albumen and associated insoluble matter, and reprecipitating the casein, preferably in a form better capable of separation from the whey, by adding sufficient acid to overcome the alkalinity of the treated buttermilk and further to increase its hydrogen ion concentration to or beyond the iso-electric point of casein. Although by methods such as these each of the three types of difficulties above listed as characteristic of buttermilk casein may in a measure be obviated, commercial operation of these methods has not been continued, doubtless due to their operating difficulties (saponification, emulsification, foaming, etc.) and to their high operating costs, occasioned by additional operations and by the very considerably increased amounts of chemicals required. By these methods, moreover, the effluent remaining after separation of the casein has been in a condition unsuited to the utilization of its valuable lipoid and other constituents.

Development of a reasonably successful method for the production of casein from sweet cream buttermilk was accomplished to meet war time demands by the U. S. Department of Agriculture and described in its Bulletin #661, dated April 9, 1918. This, the "ejector" method, was directed toward precipitating the casein of sweet cream buttermilk, which is substantially free from casein flocculated previously to or during churning, in curds of a size and firmness suitable for their ready separation from whey and wash water.

This process appears to have been based primarily upon proper temperature control and heat treatment of self-soured buttermilk of the sweet cream type, to compensate for the effects of pasteurization. As casein so made was no better as to purity than the buttermilk from which it was made, Dahlberg has suggested (p. 91 in Sutermeister) "Because of its high butterfat content, sweet cream buttermilk preferably should be separated before it is made into casein." Dahlberg doubtless did not include in his recommendation separation of the fat from equally fatty sour cream buttermilk because in the latter the casein was already partly flocculated and in intimate association with fat, and the floccules would interfere with the operation of a cream separator. The use of the ejector method does not appear to have attained any lasting success following the war, possibly due in part to the relatively small amount of available satisfactory sweet cream buttermilk and to the cost of the extra operation (separating the fat).

In summary, despite numerous attempts directed to the utilization of buttermilk for casein manufacture and several developments advanced to a point of commercial trial, I am not aware, after diligent inquiry, of any present commercial production of casein from buttermilk. On pp. 90–91 of Sutermeister, Dahlberg writes: "The high fat content and the great variation in the physical condition of most buttermilk offer difficulties in making a good quality casein and have limited the production of a grade that can be used in place of skim-milk casein. It is generally sold at a much lower price and used in animal and poultry feeds, where its high fat content is an advantage and its darker color of no consequence. The best and most economic way of handling buttermilk is to dry it and recover all the solids for poultry and animal feeding.

"Making casein from a mixture of skim-milk and buttermilk may give a satisfactory product but may also lower the quality of the entire product because of the condition of the buttermilk. The quality of casein secured from a mixture of buttermilk and skim-milk will depend largely upon the quality of the buttermilk used. A satisfactory product cannot be made by using a large proportion of buttermilk from pasteurized, high acid cream."

Freshly drawn milk is acid in respect to water; fresh sweet cream is therefore low acid; sour cream, in which the casein has flocculated, is high acid; the practice of pasteurizing cream before churning has been almost universally adopted by American creameries. On page 29 of U. S. D. A. Bulletin 661, Dahlberg states, "The combination of acid in sour cream with the temperature required for pasteurizing has an injurious effect upon the normal handling of the resulting buttermilk. The degree of acidity which may be present in the cream at the time of pasteurization without seriously interfering with the normal working of the buttermilk curd for making casein has not been determined."

Formerly a limited amount of feed grade casein was produced from buttermilk, ordinarily where facilities for preparing dried buttermilk feed were unavailable. This practice may somewhere continue to a limited extent but such a product is, of course, in no way comparable to casein suitable for use in coating compositions and for other industrial purposes and cannot meet the present high standards required for commercial casein. Federal statistical agencies which formerly collected casein production data separately for skim and buttermilk, years ago discontinued collecting separate data for buttermilk casein after its production returns had declined to a negligible figure.

My present invention for the recovery of useful products from buttermilk is a method of great simplicity and low cost. It provides good and effective separation between buttermilk casein on the one hand, and whey and wash water on the other; separation of most of the lipoids from the casein, and maintenance of the lipoids remaining with the casein in a form which tends to add to, rather than detract from, the quality of the casein compositions made from caseins so prepared; recovery of the lipoids and associated solids (which are separated from the casein) in an especially valuable form; and maintenance of the whey in a condition suitable for utilization in foodstuffs or otherwise. I have employed it successfully upon buttermilks of widely varying quality, including those fully representative of American creameries employing pasteurized sour cream. I have prepared, for many lots of buttermilk casein made by my process, casein compositions which have appeared, over a substantial period of use, to be at least the equal of commercial skim milk casein compositions of the same types. Despite the variations in raw buttermilk I employ, I have been able to secure considerable uniformity in my results.

My invention consists essentially in selectively centrifuging acidified and preferably heated but otherwise untreated buttermilk so as substantially to separate its casein from its whey and from a major portion of its lipoids, forcing the casein to the periphery of the centrifuge bowl and withdrawing the effluent of whey, lipoids, and associated materials through an outlet in the centrifuge bowl nearer its center than the separated casein packed about its periphery. Thereafter, I separate from the effluent most of its remaining lipoids either by subsequent more intensive centrifuging or by causing flocculation, for example by addition of chemicals to the effluent. I likewise use the centrifuge to separate and withdraw the wash water from washed casein. Using the wet or hydrated casein so prepared without intermediate drying, I avoid an expensive part of ordinary casein processing and obtain casein compositions of excellent quality wherein the presence of albumen, which when dried becomes relatively insoluble, instead of being objectionable—as when casein is dried before employment in casein compositions—becomes advantageous by improving the resistance to moisture of the composition.

My invention, although of extreme simplicity in its steps, should not be confused with examples in the prior art of the employment of centrifuge processes characterized by (1) use on materials differing essentially from buttermilk unchanged from the churn except as flocculation is stimulated by acidifying (as by self-souring) and heating, to which my invention is directed; (2) failure to provide for the withdrawal of the effluent liquor, failure to provide for its withdrawal except by passing it through the previously separated casein or failure to utilize a type of centrifuge basket and lining capable of holding the fine curd of buttermilk casein; (3) objects unrelated to the separation of casein from its whey and a major portion of its lipoids, or (4) objects more or less indirectly related thereto but so deficient in conception and disclosure as, after a long period, to have failed to suggest to those skilled in this art the possibility of using so simple a method for a purpose so long desired but hitherto unattained, and to be inadequate now for such suggestion, unaided by this disclosure, and (5) failure to comprise practical means of preparing casein suitable for use in industrial compositions of good quality, or of developments leading thereto.

For example, in the previously noted commercially unsuccessful patented processes for centrifuging buttermilk (see Eilerson 1,126,429), the casein must be dissolved by addition of alkali to the buttermilk in order to separate out the lipoids. This requires added chemicals, added operations for the subsequent reprecipitation and separation of the casein, and injures the effluent. By my invention, I avoid all of these disadvantages.

Similarly in other processes (cf. U. S. Patent 1,557,181 to Messmer) centrifuges having perforated bowls are used for the washing within the centrifuge bowl of casein previously substantially separated from the other constituents of milk. In such processes centrifugal force is merely used as a convenient sort of pressure for ordinary filtering, all of the contents being forced against the periphery of the bowl, the heavier casein being retained because the relatively large size of skim casein curds prevent their passing through the perforations in the periphery of the bowl, through which the wash water is forced. This process would be inapplicable to the fine, soft and friable curd of buttermilk casein, which would pass through the perforations likewise. Further my invention depends upon the selective action of the centrifuge by which the flocculated casein, whose specific gravity is relatively great, is selectively forced to the periphery of the bowl, whereas the lighter constituents of buttermilk, i. e., the lipoids and whey, are displaced and pass inwardly away from the casein rather than outwardly through it, and are withdrawn from the interior of the bowl much as is cream from a dairy separator.

Zoller, in an article on "Precipitation of grain-curd casein from pasteurized milk, including sweet cream buttermilk," published in vol. 13 Industrial and Engineering Chemistry, pp. 510 ff.

(1921), noted the use in foreign countries of centrifuges for washing casein. He mentioned that he had used "sugar centrifugals" for separating casein from whey and for washing the casein, all in one operation without extra handling, and advocated the use of centrifuges of this type. Since then there has been considerable use of centrifuges of this type for these purposes. Sugar centrifuges, however, are all of the perforate basket type as employed by Messmer cited above. If, in ordinary skim milk casein manufacture, a centrifuge is to be used for precipitating the casein, it is highly advantageous to use a centrifuge of a type which permits washing in the centrifuge without intermediate rehandling. Only the perforate basket type of centrifuge does this, as, with an imperforate basket the lighter water does not penetrate the heavier curd more than a fraction of an inch.

The use of the imperforate basket centrifuge, or other centrifugal device, whose separation of casein from lipoid and whey is occasioned not by super-colloidal differences in particle size but by differences in specific gravity, which is in accordance with the procedure of the present invention, appears in casein manufacture to be of advantage only for the manufacture of buttermilk casein, whose curd is too fine for effective perforate basket centrifugal separation and whose lipoids require true centrifugal separation for their effective removal from the casein by physical means of this sort. Like Messmer then, Zoller advocates use of the centrifugal method merely as a convenient means of filtration.

The present invention provides a method and means for the division or separation of the buttermilk solids into a plurality of constituents, one of which is made up principally of casein of such a quality that it is capable of commercial use for such purposes as paints, paper coatings and fillings, and glue; another of which contains a relatively high percentage of lipoids, including substantial amounts of lipin present in active form, and which is particularly useful as an emulsifying agent, being suitable for use in many food products for which egg yolk is now employed, as well as for many industrial purposes; and a third of which—whey—may be used for the preparation of stock feed or for the production of albumen, lactose and/or lactates.

The features and advantages of the invention will appear more readily as the description proceeds, reference being had to the accompanying drawing wherein—

Figure 1:
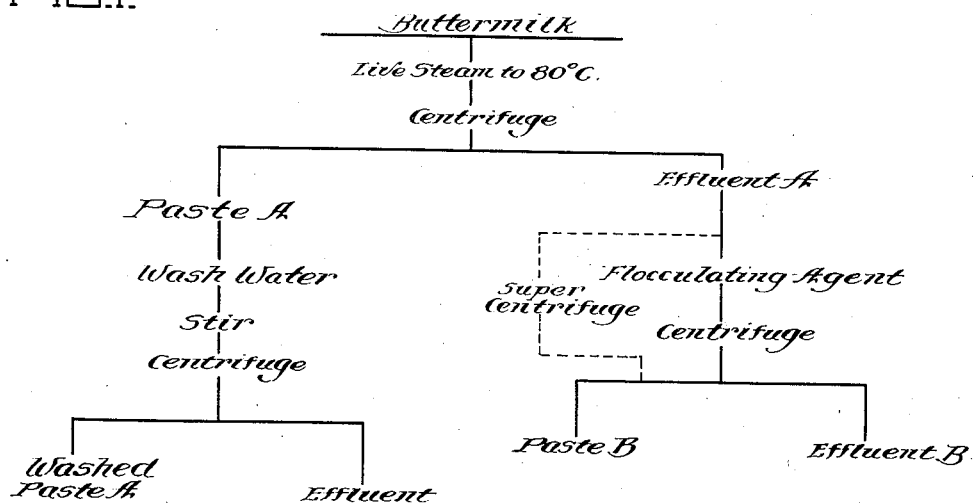
Fig. 1 is a flow chart showing the various steps of the process.
Figure 2:
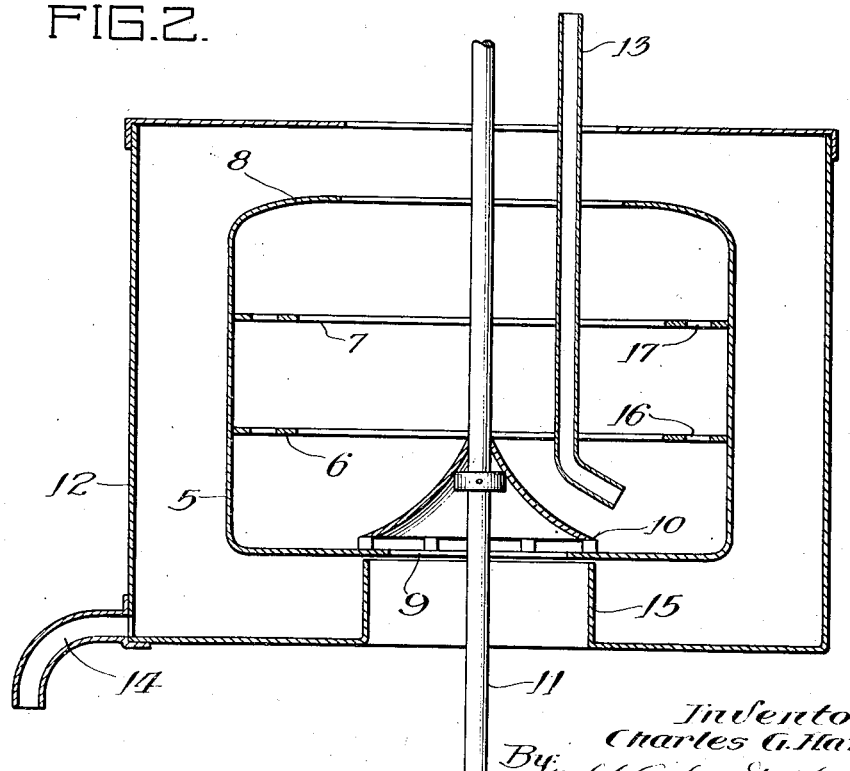
Fig. 2 is a somewhat diagrammatic view illustrating the essential parts of a centrifuge which is employed in carrying out the invention.

As indicated by the flow chart, the present process contemplates heating the buttermilk before passing it through the centrifuge. The pH range of the buttermilk should be between pH 4.0 and pH 5.8. The buttermilk, after being heated by live steam, or by other suitable means, is run into the centrifuge, and a paste is collected along the walls of the basket, the effluent passing out over the top of the basket. After a cake of sufficient thickness has been built up within the basket, the centrifuge is stopped, permitting the liquid remaining therein to drain out at the bottom of the basket. A fatty slime is sometimes formed on the inner surface of the cake, and this slime usually drains off with the liquid when the basket is stopped. The cake within the basket is removed, thoroughly mixed with wash water preferably at pH 4 to 5, and is again passed through the centrifuge, the wet or hydrated paste being collected in the basket and the effluent removed.

By this method, I am able to obtain an excellent separation between the casein and whey. Casein content is determined analytically by analysis for nitrogen. I find that the nitrogen content of the casein paste I obtain in the manner just described, which for convenience I term paste A, tends to be about 75% of the nitrogen content of the buttermilk used. But nitrogen content is equally indicative of the other proteins besides casein and of the lipins present in the buttermilk. Customarily something over 20% of the nitrogen content of buttermilk is represented by these, and by other analyses I have found that most of these tend to go with the whey. Now then if paste A contained all of the casein and a quarter of the other proteins and lipin of the buttermilk from which it was made, it would contain something under 85% of the nitrogen of the original buttermilk. Since it does in fact tend to contain about 75% of the nitrogen, it is evident that the yield of casein in paste A has tended to be about 85–90% of theoretical, a yield likely to be increased rather than diminished by more suitable commercial equipment than I have had available for my experiments. On the other hand, not only does paste A contain this large proportion of the total casein present in the original buttermilk, but it contains this casein in concentrated form relatively free from whey. Although the buttermilk which I treat customarily contains less than 2.5% casein, the dry solids content—consisting substantially of casein—of paste A has tended to range between 25 and 35% and in well conducted operations with suitable equipment to remain near 35%. This high solids content is reestablished in the same manner after washing, and in fact my paste A determinations have been principally made upon the washed and recentrifuged paste. By this excellent separation of casein and whey from each other, I have overcome the first of the difficulties above listed as having been principally responsible for failure of successful manufacture of casein from buttermilk.

The wet casein which I obtain as my washed paste A moreover has proved to be of excellent quality (at least when properly used in the preparation of coating compositions, by far the chief use of casein and the only use for which I have extensively tested my casein so prepared), adequately free from harmful impurities and in particular free from harmful quantities of the various lipoids of buttermilk which have heretofore been so detrimental to the use of buttermilk casein. As I have previously indicated, the lipoid content of buttermilk casein prepared in accordance with my invention tends in all instances to average well below that for buttermilk casein prepared by ordinary methods, i. e., decantation and/or filtration, and in good semi-commercial practice it appears possible to hold it down fairly consistently toward about 4% of the solids, which is much lower than is customarily found in ordinary filtered buttermilk casein.

Moreover the nature of the lipoids present in paste A appears to be substantially different from those remaining with buttermilk casein separated by filtration. For example, I have found that the lipoids remaining in paste A do not sweat out or separate when I have treated the wet paste to form a coating vehicle and dried the coating, or used it to form other types of casein compositions, which are dried. This is in direct contrast to my own and general experience with ordinary buttermilk casein. I believe this difference between casein prepared by my method and ordinary buttermilk casein to be due to more than the quantitative difference in lipoid content between them. Because of analytical difficulties, I have not adequately determined the specific differences between the lipoids of paste A and those of buttermilk casein prepared by filtration but I believe it probable that the former contain a higher proportion of lipin and a lower proportion of butterfat than do the latter, and that I maintain in their original active form the emulsifying properties of the lipin and its attraction to both fats and proteins, thus tending to hold the lipin in place within the casein and linked to the fat present thereby holding it in place also. The properties of lipins have not been determined adequately to permit much theorizing about them but I have found the hypothesis just stated to be convenient and it is in accord with what is believed to be known about lipins.

That in the preparation of paste A there has been a good separation from paste A of lipoids and other solids normally found in buttermilk casein is further evidenced by the materials recovered from the effluent of paste A by the present process. This effluent, which for convenience I term effluent A, is again treated by one of two alternative types of methods, for separation into a second paste, which I have termed paste B, and whey.

One method which I have employed to achieve this separation depends upon subjecting effluent A to centrifugal action considerably greater than that to which the original buttermilk was subjected. For example, I have used about 300–400 (specifically 360) gravities in separating out paste A, and 10,000–20,000 (specifically 15,500) gravities in separating out paste B. The Sharples supercentrifuge is a convenient type of apparatus to use for these higher gravities. I have not determined optimum gravities for each or the range of suitable gravities for each, but these will be readily apparent upon trial to one skilled in the art.

The greater molecular weight of most forms of casein, the principal non-aqueous constituent of paste A, than of fats, lipins and non-casein milk proteins most characteristic of paste B may help make possible the selective separation of pastes A and B by centrifuging at different gravities. Paste B may also contain some casein, quite possibly those fractions of lowest molecular weight—the molecular weights of casein are believed to be about 98,000, 188,000 and 375,000, those of lactalbumin (the second most important protein of milk) to range from 1000 to 25,000.

The other type of method I have employed for the separation of paste B is to cause flocculation of some substances originally present in or subsequently added to effluent A, relying upon the settling of the flocculated material to bring down with it (or, if centrifuging is employed, to carry with it to the periphery of the bowl) the lipoids, proteins and/or ash of effluent A which it may be desired to include in paste B. Just as a variety of gravities may doubtless be employed in obtaining paste B by centrifuging, the composition of the paste B doubtless tending to vary with the gravity employed, so by appropriate choice either or both of centrifuging or flocculating, and if flocculating is used of the method of flocculation, the composition of paste B may be varied within considerable limits to meet various purposes. As examples of flocculation, I may add a mildly alkaline solution, for which ammonium hydroxide is well adapted, in just sufficient quantity to cause flocculent precipitation of the calcium phosphates present. I may reduce the solubility of the lipin by adding a liquid in which it is relatively insoluble, as for example acetone. I may cause the albumen present to be denatured and precipitated by heating (after the familiar method of preparing albumen from whey) the whey in this instance being "impure," some of the "impurities" tend to associate themselves with the albumen and so form an albuminous paste B. I may also add a flocculating agent, such as is used in water purification or in industry, of which alum is one of many examples well known in the art, to accomplish much the same purpose. Generally I find it convenient to separate the flocculated and associated material which comprises paste B from the remaining whey by means of centrifuging, in much the same manner and by much the same gravity as I use to separate paste A from effluent A.

Inasmuch, as has been stated, the yield and composition of paste B may be varied over wide limits by choice of methods, any generalizations as to its composition are fruitless. The yield in any event is much lower than that of paste A as there is of course much less nonreadily-water-soluble material to remove from effluent A than from the original buttermilk. The following characterizations, however, apply as indicated to pastes B made by supercentrifuging effluent A or by treating it with ammonia and centrifuging, as described in detail below. Paste B contains a considerably higher proportion of moisture than paste A. Its solids content has tended to be between about 12% and 20%, rather than between 25% and 35% as the solids content in paste A has tended to be. Its lipoid content appears to be very considerably greater than that of paste A, having ranged from about 20% to over 35% on a bone-dry basis, of course being markedly influenced by the lipoid content of the original buttermilk. Its lipoids contain an appreciable proportion of lipin. In buttermilk, the proportion of lipin to total lipoids generally is between 20 and 25%, the proportion varying materially and apparently depending principally on the total lipoid content of the buttermilk, the lipin content tending to vary within a narrower range than the fat content. The extent to which the relationship between fat and lipin is disturbed in preparing paste A has not been adequately determined. It appears likely however that lipin is retained in paste A somewhat more readily than fat. In any event however the lipin content of paste B is material, generally amounting to at least 3% (dry basis), which is about 20 to 30 times the concentration of lipin in the original buttermilk; this percentage may be markedly increased by proper control of operations, if so desired, as will be evident from the present disclosure. Paste B, as prepared by supercentrifuging, of course, has an ash content markedly lower than when prepared by precipitating the calcium phosphate. When ammonia is used, the ash content has tended to vary markedly, i. e., between about 18 and 50% on a dry basis. With lipoids and ash high, proteins have been low as compared with paste A, ranging between about 30 and 60%.

As mentioned, paste B is especially useful as an emulsifying agent, for which purpose it appears to have marked advantages, being in many respect comparable even to egg-yolk, with which it has a number of resemblances. It has been stated of late in the scientific literature, especially that pertaining to the food industries (cf. vol. 27, Journal of Industrial and Engineering Chemistry, p. 1222, 1935, in an article by H. M. Sell, A. G. Olsen, and R. E. Kremers), that the unusual emulsifying properties of egg-yolk are due to its proteo-lipin complex, i. e., an unstable "complex" of lipin and undetermined protein. It is believed (cf. Dahle in pages 60–71 of the January 1937 issue of the Ice Cream Review), that the membrane surrounding butterfat globules in milk is composed of much the same sort of material which, whatever its composition, has properties in many respects comparable to those of egg-yolk. It is established (cf. Bird, Dahle, op. cit.) that the lipin and that this fat globule membrane of milk tend to be concentrated in buttermilk. I believe that in paste B I have a much greater concentration of this same material from the buttermilk and that it is responsible, at least to an important degree, for the excellent emulsifying properties of paste B. I maintain paste B, when it is to be used as an emulsifying agent, in moist condition so that its active emulsifying properties are not destroyed, as might be expected were the hypothetical proteo-lipin complex broken or injured by dehydration of the protein, and maintain the lipin in association with other lipoids to assist its preservation. I find that the emulsifying properties of paste B are beyond and of a different order than those of ordinary commercial lipin (sold as lecithin), the ordinary lipin in its preparation being dissociated from the proteins with which it apparently had been originally associated. Although I have shown how to prevent change from the active form of my emulsifying agent, should it be desired for any reason to obtain from paste B more or less pure lipin, for the uses to which this product, now known in commerce as lecithin, is put, it would be relatively easy to obtain this by solvent extraction, and paste B would be an excellent and concentrated source thereof. The utility of paste B as an emulsifying agent, in which the lipin is maintained in its original form, is likely to be too great to afford any incentive for such separation, as there now appears to be no other commercially available source of this type of emulsifying agent except egg yolk, which for many purposes is too expensive and for others unsatisfactory because of the deleterious effect its inactive components may have for certain applications.

My study of the emulsifying properties of paste B has likewise indicated that a mixture of casein and paste B, or ordinary undried buttermilk casein, possesses emulsifying properties superior to those possessed by skim milk casein which make it superior for use in insecticides and other purposes for which casein is now used because of its properties as a protective colloid.

As, when suitably prepared, paste B, like egg-yolk is suitable for use in food products, such as mayonnaise or ice cream, as well as for industrial applications for some of which egg yolk, apart from its cost, appears less well suited, by my process, in which the major portion of the butterfat of buttermilk appears in paste B, I have also a means for recovering from buttermilk in more or less concentrated and edible form the butterfat lost in churning, which has long been an object of creamery operators and others. Likewise by causing the natural calcium phosphate of buttermilk to be precipitated in paste B, I am able to include in paste B another substance of value in food products.

If I wish to use paste B for a purpose for which butterfat is of no particular advantage, however, I am able to reduce the butterfat content of paste B, as by regulating the temperature and the gravity at which pastes A and B are prepared and recovering the butterfat separately. For example, I have noted that butterfat tends to collect on the interior edge of the layer of paste A built up in centrifuging, and in particular between the first and second shelves of the centrifuge. Means may be provided for the separate removal of this layer, which otherwise tends to be lost in effluent A. I have in fact termed this butterfat and its associated lipins, etc. (from which it appears capable of refinement) as paste $A^1$.

Effective separation of pastes A and B from buttermilk, as may readily be accomplished, leaves little behind except straight whey, i. e., moisture, lactose, lactic acid, water-soluble pigments and vitamins, and (depending upon the processes employed) a reduced amount of non-casein protein and of water soluble salts. If methods of preparing pastes A and B are appropriately chosen for this purpose (e. g., unsuitable chemicals avoided) the whey remaining may be utilized for feed or industrial purposes, as is well known. In this way buttermilk may be completely utilized in at least three major types of products—casein, emulsifying agent, and whey—each to its best advantage.

A typical example of one complete operation will now be described.

Take fifty liters (117 lbs.) of commercially obtained buttermilk, which may include also the wash water used in washing the butter. The pH of the buttermilk, if not low enough may be adjusted to the desired point (i. e., between 4.0 and 5.8) by the use of suitable acidic materials, or by allowing the buttermilk to self-sour, which may be brought about by natural processes or by inoculation with suitable bacteria. The specific gravity of buttermilk obtained in this fashion is usually approximately 1.06. The total solids present will vary somewhat in different batches of buttermilk. Usually, however, the solids content is between 7% and 9% of the total weight and the lipoid content is usually between 0.40% and 0.80% (Roese-Gottlieb extraction).

The buttermilk is heated to a temperature between 60° C. and 80° C. Any suitable method of heating may be employed. I have used steam, discharging it directly into the buttermilk to raise the temperature to the desired range. The steam method of heating the buttermilk dilutes the buttermilk somewhat so that the resultant volume may be about 62 liters.

The buttermilk is then passed through a centrifuge such as that shown in the accompanying drawing. This centrifuge is of the imperforate basket type in which a rotating basket 5 is provided with internal shelves 6 and 7. The top of the basket is curved inwardly as indicated at 8 and the bottom of the basket is open at 9, the opening 9 being considerably smaller than the opening at the top. A spider 10 mounts the basket upon a rotating stem 11. The basket 5 is mounted in a tank 12 which has an inlet opening at 13 through the cover thereof and an outlet opening at 14 for the discharge of liquid. A vertical flange 15 is provided at the bottom of the tank 12 and extends up close to the bottom of the basket 5. The shelves 6 and 7 have annularly spaced openings 16 and 17 therein through which liquid can rise as it is forced outward by the centrifugal force created in whirling the basket. In the case of a centrifuge equipped with a 40 inch basket, a rate of 800 R. P. M. gives adequate separation.

The rate of feeding the buttermilk through the basket does not appear to be particularly important. It may be varied over a rather wide range so long as it is not fed so fast as to cause a carryover of substantial portions of the precipitated solids. The action of the centrifuge separates the greater part of the precipitated solids from the liquid by the formation of a layer of paste A against the vertical inner face of the basket wall. This layer gradually builds up in thickness until it extends in past the openings in the shelves. The flow of liquid continues through the paste, or through channels formed in it, and through the shelf openings. On the inner surface of the paste there is sometimes a thin layer of paste A¹ which is washed out with the liquid left in the basket when the centrifuge is stopped, unless means are provided for removing it separately. The effluent passes out the top of the basket and is drained out of the outer container and further treated as described hereinafter. Any of the paste A¹ washed out with the last of the liquid in the basket may, if desired, be added to this effluent.

The paste A is removed from the basket and washed with water at pH about 4.8 using about 45 liters of water for the paste recovered from 50 liters of buttermilk. The paste 3 and water are again passed through the centrifuge in the same manner and the paste is again deposited in the basket. The effluent from the washing may be mixed with fresh buttermilk if desired, or may be discarded. The paste A is removed from the centrifuge and it will be found usually to contain at least 25% solids.

The effluent materials may be treated alternatively in two types of ways to recover paste B, as has already been stated.

In carrying out the first of the two methods for obtaining paste B, I run the effluent material from preparing paste A through a supercentrifuge— e. g., a Sharples supercentrifuge. The resulting solids constitute paste B, and the separated liquid, which is the whey, may be utilized for purposes already indicated, or discarded.

The second method (flocculation) may be carried out in a number of ways, as already indicated. For example, I may add 26° Bé. ammonia to the effluent A until the latter contains about 0.5% by volume of NH₃. Alternatively, Ca(OH)₂ may be added to the effluent A until the latter reaches a pH of about 10. In either case, the resulting alkaline effluent is run through the centrifuge in the same manner as described for preparing paste A. Paste B accumulates on the inner walls of the basket and is removed, in the same manner as paste A, and the liquid portion (whey) may be utilized or discarded as already stated.

The amount of paste A recovered will vary somewhat. A recovery of 7 lbs. to 9 lbs. may be expected from 50 liters of buttermilk. About 4 lbs. to 5 lbs. of paste B may be expected.

An analysis of typical pastes A, using the standard nitrogen test (X6.38) for protein and the Mojonnier (Roese-Gottlieb) test for total lipoids, gives the following results in which the protein content is probably in most instances somewhat underestimated.

|  | Average minimum | Average | Average maximum |
|---|---|---|---|
|  | Percent | Percent | Percent |
| Moisture | 65 | 70 | 70 |
| Lipoids (dry basis) | 4 | 6 | 8 |
| Protein (dry basis) | 86 | 90 | 95 |
| Ash (dry basis) | 1.5 | 2.0 | 2.5 |

An analysis of typical pastes B prepared by means of ammonia gives the following results:

|  | Average minimum | Average | Average maximum |
|---|---|---|---|
|  | Percent | Percent | Percent |
| Moisture | 80 | 85 | 89 |
| Lipoids (dry basis) | 20 | 28 | 35 |
| Protein (dry basis) | 30 | 42 | 60 |
| Ash (dry basis) | 18 | 30 | 50 |

While the preferred application of the invention is described herein, it is understood that the scope of the invention is not limited except in so far as it is limited by the following claims:

1. A process of treating buttermilk whereby to make available for separate use the useful milk solids therein without deleterious change in their individual characteristics which comprises separating the constituents of buttermilk into at least three groups, one of which consists principally of proteins as precipitated in the buttermilk and including a small portion of the lipoids, a second of which contains most of the lipoids of buttermilk and a minor portion of proteins, and the third of which consists principally of the whey containing the water soluble milk solids.

2. A process of treating buttermilk whereby to make available for separate use the useful milk solids therein without deleterious change in their individual characteristics which comprises concentrating the precipitated casein of the buttermilk in a paste containing about 20% to 35% solids, and concentrating the lipoids of the buttermilk in a second paste containing about 10% to 20% solids.

3. A process of treating buttermilk whereby to make available for separate use the useful milk solids therein without deleterious change in their individual characteristics which comprises heating buttermilk having a pH value between 4.0 and 5.8 to a temperature of about 60° to 80° C., then effecting a mechanical separation of the major portion of the lipoids from the precipitated casein of the buttermilk and concentrating the casein in a paste containing about 20% to 35% solids, and thereafter separating the lipoids in the remainder of the buttermilk from the whey.

4. A process of recovering solids from buttermilk which comprises subjecting the buttermilk while in an acid condition to centrifugal action whereby most of that portion of the precipitated solids comprising casein is forced outwardly from the liquid and collected against a wall while the remaining solids and the liquid are withdrawn.

5. A process of recovering solids from buttermilk which comprises subjecting the buttermilk at a pH value between 4.0 and 5.8 and at a temperature between 60° and 80° C., to centrifugal action whereby most of that portion of the precipitated solids comprising casein is forced outwardly from the liquid and collected against a wall while the remaining solids and the liquid are withdrawn.

6. A process of recovering solids from buttermilk which comprises subjecting the buttermilk while in an acid condition to centrifugal action having a force of about 300 to 400 gravities, whereby most of that portion of the precipitated solids comprising casein is forced outwardly from the liquid and collected against a wall while the remaining solids and the liquid are withdrawn.

7. A process of recovering solids from buttermilk which comprises separating most of that portion of the precipitated solids comprising casein from the remainder thereof by centrifugal action and thereafter subjecting the resulting effluent and the remaining solids contained therein to a second centrifugal action to obtain a second class of solids comprising principally lipoids, albumin and lighter parts of casein.

8. A process of recovering solids from buttermilk, which comprises separating most of that portion of the precipitated solids comprising casein from the remainder thereof comprising principally lipoids, albumin and lighter parts of casein by centrifugal action; adding to the resulting effluent and the remaining solids contained therein an agent which flocculates said remaining solids, and then removing the flocculated solids from the liquid.

9. A process of recovering solids from buttermilk, wherein two successive centrifuging steps are employed, which comprises subjecting buttermilk at a pH value between 4.0 and 5.8 to a first centrifuging at gravities of about 300 to 400 whereby to remove from the buttermilk the precipitated solids separable therefrom at said gravities, and then subjecting the effluent from said first centrifuging to a second centrifuging wherein the gravities are in the order of 20 to 70 times that of the first centrifuging whereby to remove from said effluent the solids separable therefrom at said gravities.

10. A process of recovering solids from buttermilk, wherein two successive centrifuging steps are employed, which comprises subjecting buttermilk at a pH value between 4 and 5.8 to a first centrifuging at gravities in the order of 300 to 400, whereby to remove from the buttermilk the precipitated solids separable therefrom at said gravities, then subjecting the effluent from said first centrifuging to the action of agents which flocculate certain of the solids contained in said effluent, and then subjecting the so-treated effluent to a second centrifuging whereby to separate the flocculated solids from the liquid phase.

11. A process of recovering solids from buttermilk which comprises subjecting the buttermilk while in an acid condition to centrifugal action to divide buttermilk into a paste of high specific gravity comprising principally acid precipitated casein of the buttermilk and an effluent of lower specific gravity, washing the paste and removing the wash water therefrom by centrifugal action, and thereafter separating out from said effluent a second class of solids of lower specific gravity comprising principally lipoids, albumin and lighter parts of casein by centrifugal action.

12. Buttermilk solids having a casein content above 75% of the total solids and having therein less than 25% of the lipoids originally present in the buttermilk.

13. A paste comprising buttermilk solids lighter than casein and having a lipoid content in excess of about 20% on a bone dry basis.

14. A product containing at least 3% milk lipin on a bone dry basis, said lipin being substantially in its original active form and association.

15. A paste comprising milk solids lighter than casein, and containing butter fat and at least 3% lipin on a bone-dry basis.

16. A process of recovering acid precipitated casein from buttermilk which comprises subjecting the buttermilk while in an acid condition to a centrifuging by whirling the same in a shell having a solid circumferential wall, thereby accumulating a paste on said wall in which the acid precipitated casein of the buttermilk is concentrated and compressed so as to be separated from the lighter liquids and solids of the buttermilk, drawing off the lighter liquids and solids and removing the paste from the wall.

17. A process of recovering acid precipitated casein from buttermilk which comprises subjecting the buttermilk while in an acid condition to a centrifuging at gravities of about 300-400 by whirling the same in a shell having a solid circumferential wall, thereby accumulating a paste on said wall in which the acid precipitated casein of the buttermilk is concentrated and compressed so as to be separated from the lighter liquids and solids of the buttermilk, drawing off the lighter liquids and solids and removing the paste from the wall.

18. A process of treating buttermilk whereby to make available for separate use the useful milk solids therein without deleterious change in their individual characteristics, which comprises heating buttermilk having a pH value between 4.0 and 5.8 to a temperature of about 60° to 80° C., then by centrifuging effecting a mechanical separation of the major portion of the lipoids from the precipitated casein of the buttermilk and by the same action concentrating the casein in a paste containing about 20% to 35% solids.

CHARLES G. HARFORD.